(12) United States Patent
Davies et al.

(10) Patent No.: US 10,135,362 B2
(45) Date of Patent: Nov. 20, 2018

(54) METHOD FOR CONTROLLING A POWER CONVERSION SYSTEM

(71) Applicants: Alexander Philip Davies, Duncraig (AU); Kevin Stephen Davies, Duncraig (AU)

(72) Inventors: Alexander Philip Davies, Duncraig (AU); Kevin Stephen Davies, Duncraig (AU)

( * ) Notice: Subject to any disclaimer, the term of this patent is extended or adjusted under 35 U.S.C. 154(b) by 0 days.

(21) Appl. No.: 15/317,111

(22) PCT Filed: Jul. 1, 2015

(86) PCT No.: PCT/AU2015/050367
§ 371 (c)(1),
(2) Date: Dec. 7, 2016

(87) PCT Pub. No.: WO2016/008003
PCT Pub. Date: Jan. 21, 2016

(65) Prior Publication Data
US 2017/0110985 A1    Apr. 20, 2017

(30) Foreign Application Priority Data

Jul. 14, 2014  (AU) ............................... 2014902713

(51) Int. Cl.
*H02M 7/537* (2006.01)
*H02M 1/44* (2007.01)
*H02M 1/32* (2007.01)
*H02M 1/12* (2006.01)

(52) U.S. Cl.
CPC ............. *H02M 7/537* (2013.01); *H02M 1/12* (2013.01); *H02M 1/32* (2013.01); *H02M 1/44* (2013.01)

(58) Field of Classification Search
CPC .......... H02M 7/537; H02M 1/12; H02M 1/32; H02M 1/44
See application file for complete search history.

(56) References Cited

U.S. PATENT DOCUMENTS

| 5,642,275 A * | 6/1997 | Peng ....................... H02M 7/49 363/137 |
| 9,685,886 B2 * | 6/2017 | Modeer ................... H02J 3/383 |
| 2013/0223115 A1 * | 8/2013 | Tsuchiya ................ H02M 7/49 363/68 |

* cited by examiner

*Primary Examiner* — Jue Zhang
(74) *Attorney, Agent, or Firm* — Tope-McKay & Associates

(57) ABSTRACT

Described is a method for converting power including controlling operation of a plurality of series connected modules including a DC power sources and storage devices such that the total voltage across the series connected modules includes an AC signal. A storage parameter is defined based on a sum of a function of the voltages in the storage devices in the modules and one or more voltage control levels are defined for each of or a plurality of the storage devices. An average current drawn from the series connected modules over a time period is set such that the storage parameter approaches a target value. The target value is decreased for a subsequent time period in the event that none the voltage control levels are reached and increased in the event that one or more of the voltage control levels are reached.

23 Claims, 1 Drawing Sheet

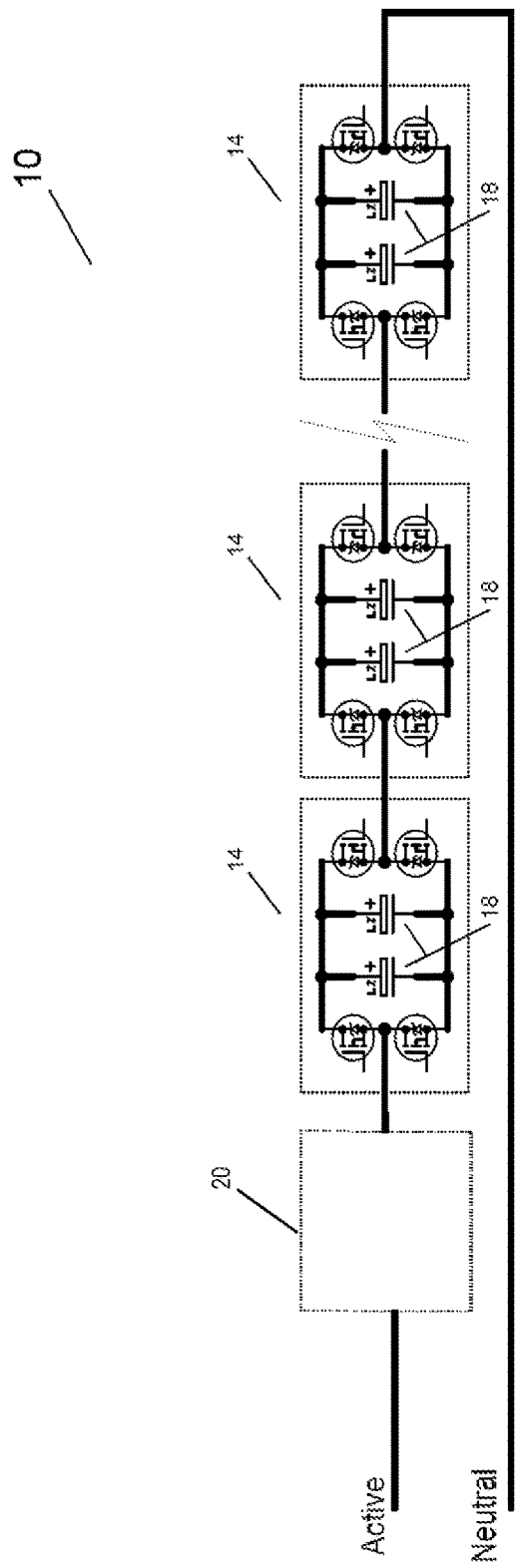

METHOD FOR CONTROLLING A POWER CONVERSION SYSTEM

FIELD OF THE INVENTION

The present invention relates to a method for controlling a power conversion system of the type for converting DC to AC power.

BACKGROUND TO THE INVENTION

There are a number of applications in which conversion is required between DC power and AC power. The applicants earlier International patent applications PCT/AU2011/000985, PCT/AU2012/000964 and PCT/AU2015/050315, describe such systems having improved methods of performing this conversion.

The systems described provide for creation of an AC signal suitable for power supply or injection into mains power from DC sources consisting of a string of modules each connected to a DC power source. The modules are transitioned in an out of series in order to form an AC signal or in order to form a stepwise approximation of an AC signal with further ramping being performed to allow the signal to more closely resemble a smooth AC signal.

One issue with such a system relates to determining which modules should be transitioned in or out of series in order to achieve reliable and efficient AC power supply or mains grid current injection.

Poor Electromagnetic Compatibility (EMC) can lead to interference with close by or connected devices and poor harmonic quality of the AC signal can lead to undue heating and interference with connected devices.

An issue with such a system relates to stable control and the operation of the modules as they are transitioned into and out of the series circuit such that levels of Electromagnetic Compatibility (EMC) and harmonics remain acceptable.

It is desired to have a system that is suitable for creating AC signals for stand-alone or grid power injection applications.

The present invention relates to an improved system and method for conversion of DC to AC power aimed at addressing, at least in part, the abovementioned issues.

SUMMARY OF THE INVENTION

According to one aspect of the present invention there is provided a method for controlling a power conversion system comprising:
controlling operation of a plurality of series connected modules, at least some of said modules including a DC power source and a storage device charged by the power source, by transitioning the voltage applied by the storage device between the input and the output of the modules such that the total voltage across the series connected modules comprises an AC signal;
defining one or more voltage control levels for each of or a plurality of the storage devices;
regulating an AC current drawn from the series connected modules over a time period such that a storage parameter based on a sum of a function of the voltages in the storage devices in the modules approaches a target value;
decreasing the target value for a subsequent time period in the event that none the voltage control levels are reached; or
increasing the target value for a subsequent time period in the event that one or more of the voltage control levels are reached.

Preferably the storage parameter is based on a sum of the squares of the voltages in the storage devices in the modules.

Preferably the voltage control levels include a total required voltage level, being a minimum sum of the voltages of the storage devices to output a desired AC signal plus a headroom level.

In a preferred embodiment, the voltage control levels include a power point target level, being a minimum individual module voltage based on the maximum power point of the power source within the module.

Preferably the method includes the further steps of:
transitioning the storage devices of the modules between the input and the output of the modules to provide a maximum module voltage and a minimum module voltage; and
selecting which modules o transition from a group of modules based on one or more selection criteria;
wherein one of the selection criteria comprises a power point differential value, being the difference between the voltage of the storage device of each module and the power point target value of the module.

Preferably the modules to which the power point differential value is applied may comprise groups of modules having one of a plurality of preference levels such that modules having a higher preference level will be switched into the series connection in preference to modules having a lower preference level such that modules having a lower preference level will move to higher voltage levels.

In a preferred embodiment, more than two preference levels may be set such that modules allowed to move to a voltage significantly above their maximum power point will operate at different levels.

In one embodiment, a first preference level is provided for the modules to operate at around their maximum power point, a second preference level is provided for modules operating at a transitional level and a third preference level for modules acting as voltage support.

Preferably a further selection criteria is defined comprising a maximum operating voltage level, such that should a module exceed the maximum operating voltage level, the module is switched preferentially into the series connection to reduce the voltage on the module.

Preferably the control unit modifies preference levels of modules depending on the voltage level of the module.

Preferably the maximum operating voltage is set below a maximum module voltage, being a level above which the module may be damaged, such that the difference between the maximum operating module voltage and the maximum module voltage is set to allow sufficient energy to be absorbed across the modules to account for expected overvoltage events.

Preferably modules with a voltage approaching the maximum module voltage will switch to bypass.

In one embodiment, current is monitored during overvoltage events such that when it is determined that the current flowing after the module is in bypass is sufficient to raise the voltage of the other modules in the system to around their maximum module voltage, the module switches out of bypass to further absorb energy.

In one embodiment, the control unit communicates with each of the modules via control lines and the modules maintain a phase locked loop to keep timing synchronised across modules.

Preferably local data communications are ignored during switching times to minimise communication errors potentially caused during such switching.

Preferably the switching times of the modules are controlled to occur at predefined time periods or time periods defined according to a formula.

In one embodiment, the formula for determining switching times includes a pseudorandom component such that interference is broad spectrum.

In one embodiment, the switching times are based on a prime factor harmonic of the mains greater than a maximum harmonic.

Preferably the method includes the steps of predicting voltages in the modules according to information regarding the series current and stored performance information including how the module voltage changes according to total energy stored and using the expected voltage of the modules to control switching of the modules.

Preferably the method includes the step of recording information regarding the actual voltage of the modules at intervals of time and varying the stored performance information based on the difference between the actual voltage of the module and the expected voltage of the module.

In one embodiment, the method includes the steps of storing information regarding I-V curves of power sources within modules and using the stored information to control operation of step up/down regulators within modules.

Preferably the step up/down regulators are switched from bypass when the power lost by operation of the module away from its maximum power point results in a power loss larger than the, power loss resulting from activating the step up/down regulator.

In one embodiment, the temperature of a power source is determined and a maximum power point is determined based on the temperature.

BRIEF DESCRIPTION OF THE DRAWINGS

The invention will now be described, by way of example, with reference to the following drawings, in which:

FIG. 1 is a block diagram of power conversion system to which the method of the present may be applied.

DETAILED DESCRIPTION OF PREFERRED EMBODIMENTS

The power conversion system 10 is generally of the type described in the applicant's earlier International patent applications PCT/AU2011/000985, PCT/AU2012/000964 and PCT/AU2015/050315. FIG. 1 is a block diagram representing the general elements of the system 10.

The power conversion system 10 includes a plurality of modules 14 each associated with at least one power source. The power sources may be, for example, solar panels or batteries.

Each of the modules 14 is also provided with a storage device 18 and is connected to the terminals of the power source. The storage devices 18 may comprise electrolytic capacitors or batteries of a type that efficiently and reliably supply pulses of current. The storage devices 18 stores charge from the power source such that when the module 14 is bypassed, power generated by the power source continues to be stored in the storage device 18 for use. The storage devices 18 may be separate from or part of the power source.

The modules 14 may also comprise a switching regulator between the power source and the storage device 18 to control the voltage level supplied from the power source to the storage device. The switching regulator may comprise a step up and/or step down regulator.

Each of these modules 14 has an input and an output. DC voltage can be supplied from the storage device 18 across the input and the output and the modules 14 are to be connected in series such that the output of each module 14 is connected to the input of a subsequent module 14. The power conversion system 10 therefore includes a system input and a system output providing the series voltage across each of the modules 14. That is, the sum of the voltages provided across the inputs and outputs of all of the modules 14.

Each of the modules 14 is provided with voltage control circuitry to vary the voltage supplied across the input and output of the module 14. The module voltage provided across the input and the output may be varied between a maximum module voltage and a minimum module voltage by the voltage control circuitry. The voltage control circuitry may comprise switching devices as described in the applicant's earlier patent applications as mentioned above. The switching devices are connected such the storage device 18 can be transitioned to either provide a voltage between the input and output in a first polarity, provide a voltage between the input and output in a second polarity or be bypassed. Therefore in this embodiment the maximum module voltage is the storage device voltage and the minimum module voltage is the reverse polarity of the storage device voltage. Transitions may be ramped by a switching regulator to more closely approximate an AC signal or be stewed by linear or switching regulator to thereby reduce EMC.

In general, as the mains signal voltage increases in the positive portion of its cycle, the modules 14 are transitioned from a bypass state to a state in which the storage device 18 is connected in the first (positive) polarity to raise the system output voltage to follow the mains signal. As the mains voltage falls in the positive portion of the cycle, the modules 14 are transitioned to the bypass state to lower the total voltage and follow the mains signal. The same occurs during the negative portion of the mains cycle with the modules 14 being transitioned such that the voltage is supplied in the second (negative) polarity to follow the mains signal. As described in the applicant's abovementioned earlier patents, the modules 14 may alternatively form a rectified AC signal.

The power conversion system 10 is provided with a control unit (not shown) to control the module states and associated state transitions. The control unit is connected to a control line that communicates information to each of the modules 14 in order to control the transitions. Wireless communication methods may be used to relay information to and/or from the control unit.

For grid injection, the control unit is in communication with the mains supply to receive information regarding the phase voltage and current of the mains signal and controls the modules such that the AC signal voltage created is in phase with the mains supply and the current is controlled to be suitable for supply to the mains system.

The system 10 may also include a compensator unit 20 provided in series with the modules 14. The compensator unit 20 includes also a storage device 18 and compensator voltage control circuitry 21. The storage device 18 is charged by power sources of the system 10 and supplies voltage in series with the modules 14 via the compensator voltage control circuitry 21, which is controlled by the control unit.

The control unit is in communication with each of the modules 14 and the compensator unit 20. The control unit receives information from each of the modules 14 such that the control unit can determine the charge on each of the storage devices 18 and therefore the maximum and minimum voltages available to be delivered to the system 10 by transitioning in or out each of the modules 14. The control unit monitors and stores information regarding capacitances of the storage devices in the modules 14, 20 charge rates and stored charge. As the control unit has information regarding which modules 14 are connected in series at any one time, each modules input power from its DC source, and also monitors the series current, the control unit may determine the energy stored in each module over time. Further, the control unit also receives communications from each of the modules 14, 20 regarding stored charge at regular intervals to correct for errors caused while estimating the stored charge over time.

When operating with a compensator, the control unit operates the voltage control circuitry of each of the modules 14 to transition the modules between maximum voltage, minimum voltage and zero in order to form a ramped or stepwise approximation of an AC signal Current is controlled and a smoother AC signal is generated by operation of the compensator unit 20. While each of the modules 14 is supplying maximum, minimum or zero voltage, the compensator voltage control circuitry 21 operates to ramp up or down the voltage supplied by the compensator unit 20. The rate at which the ramping occurs is controlled to cause the series connection to follow the rate of change of the desired AC signal. The ramping up or down of the voltage supplied by the compensator unit 20 may be via PWM control of a switching regulator, as described in the applicant's earlier patent applications.

The control unit controls operation of the compensator unit 20 as each of the modules 14 is transitioned into, or out of, the series circuit. In particular, as each of the modules 14 is transitioned from zero to maximum or minimum voltage, or vice versa, the compensator voltage control circuitry 21 of the compensator unit 20 applies a corresponding but opposite change in the voltage level supplied by the compensator unit 20. For example, if the control unit transitions a module 14 from zero, into the series connection such that the module 14 supplies 40V, then the voltage supplied by the compensator unit 20 is varied to be offset by −40V such that the series output remains relatively constant. The compensator unit 20 then continues to ramp up as before. By monitoring the change in series voltage as a module steps (or momentary changes of a voltage across a series connected smoothing inductor), the compensator can update its estimate of a module's voltage and capacitance, thus refining further estimates of module voltages and energy levels.

The method of the present invention relates to controlling the current delivered by the system over a series of time period to maximise performance of the system and the modules of the system.

The method includes the step of defining a storage parameter for the system 10. The storage parameter relates to the storage devices 18 within the modules 14 and comprises a sum of a defined function based on the voltages in the storage devices 18.

In one embodiment, the function of the voltages is based on a square of the voltages of the storage devices 18. The function is also based on the capacitances of the storage devices 18 and therefore provides a measure of the energy within the storage devices 18. The storage parameter therefore comprises a sum of the energy stored with the storage devices 18 of the modules 14. Energy within the system of modules changes linearly according to average current over mains cycles and provides a suitably stable control variable.

The method also includes defining one or more voltage control levels. The voltage control levels may be applied to each of the modules 14 individually and also for a plurality or the modules 14.

The voltage control levels include a total required voltage level, being a level based on a sum of all the voltages within the modules 14. The total required voltage level comprises a minimum value such that when the sum of the voltages within the modules 14 falls below the voltage control level action is taken. The total required voltage level is based on the peak voltage of the AC signal to be generated by the system plus a contingent overvoltage and a headroom level. The peak voltage defines the rated level of the AC signal and the contingent overvoltage sets the expected levels that may occur over the rated level due to spikes or surges. The peak voltage that affects the voltage control level may be changed over time as the average AC signal voltage varies through a period of time, such as a day. The headroom level comprises a level set within the system 10 to ensure adequate voltage is available for reliable operation to deal with a level of surges and to allow for voltage droop that occurs while transitioned in series and being discharged by the series current.

The voltage control levels also include a power point target level. The power point target level comprises a voltage level defined individually per module. The power point target level is defined based on a maximum power point of the power source of the module. That is, a level below (for a step up switching regulator) or above (for a step down switching regulator) which the power deliverable by the module is unacceptably degraded.

The maximum power point may be pre-programmed into the system or determined by controlling the switching regulator to draw down the voltage on the power source then allowing the power source to charge a capacitor while monitoring the rate of change of voltage on the capacitor to determine current in order to create an I-V curve. Such a method is suitable for high impedance power sources such as solar panels and fuel cells.

The maximum power point may also relate to the voltage at which rechargeable batteries are most efficiently charged or discharged and a formula or table relating battery temperatures to maximum power point could, be used along with a method for determining the battery temperature in order to estimate the maximum power point voltage of the power source. The I-V curve could also be measured over time by the control unit measuring the power source voltage at varied levels of current and the optimal charging or discharging voltages (maximum power point) determined with reference to the rate of change of the currents with respect to voltages as the battery becomes charged or discharged over time.

Step up regulators are generally described below but operation appropriate for step down may also be understood by applying appropriate reasoning taking into account that maximum power point minimum limits apply for step up and maximum power point maximum limits apply for step down.

The system includes also means to control current delivered by the system over a time period. The means may comprise circuitry to vary the average current delivered by the system over one or more mains cycles, or a portion of a mains cycle.

As the control unit of the system has information regarding the voltage levels within the modules, the capacitances of storage devices, the power available from the power sources and the system output voltage, the control unit can determine an average current required over a time period such that the storage parameter approaches a target value. The control unit sets the target value for each particular time period and controls the current in order for the storage parameter to approach the target value.

The method includes the steps of monitoring the voltages within the system to determine if any of the voltage control levels have been passed. In the event that none of the voltage control levels have been passed, the control unit decreases the target value of the storage parameter for a subsequent time period. For example, if the total voltage of the modules is higher than the total required voltage level and none of the modules is operating below their power point target levels, the target value is decremented. The current is then controlled for the subsequent time period to approach the new target value.

In the event that one or more of the control values are passed, then the target level is incremented and the current controlled for the subsequent time period to approach the new target value. For example, one of the modules may have a voltage falling below the power point target level and the current through the system is decreased such that the storage parameter approaches a new higher target value.

As described above, the control unit controls switching of the modules in and out of the series connection to approximate an AC signal. The selection of which module to switch into or out of the series connection is performed by selecting a module according to one or more selection criteria. One of the selection criteria comprises a power point differential value being the difference between the voltage of each module and the power point target value of the module.

During operation modules are transitioned into the circuit preferentially based on the power point differential values, with modules with a larger power point differential values being preferentially transitioned into the series connection. Modules with larger power point differential values are transitioned into the series connection for longer periods of each AC cycle relative to modules with a lower power point differential value. That is, when the output of the system is to be stepped up to create the AC signal, modules with a higher power point differential value are transitioned into the series connection ahead of modules with a lower power point differential value. When the system output is to be stepped down, modules with a lower power point differential value are transitioned out of the series connection before modules with a higher power point differential value.

The modules to which the power point differential value is applied may comprise groups of modules having one of a plurality of preference levels. Modules having a lower preference level will not be preferentially transitioned into the series connection even if the power point differential value of the module is higher than that of a module having a higher preference level. That is, modules having the preference level will be transitioned according to their power point differential level but modules having a lower preference level will not be transitioned into the series connection in preference to a module with a higher preference level.

In this way, a group of modules (having a lower preference level) may be allowed to move to higher voltage levels, acting as 'voltage support' modules. These modules having a lower preference levels may therefore provide higher voltage levels to the system and allow modules with a higher preference value to operate closer to their maximum power point.

More than two preference levels may be set such that modules allowed to move to a voltage significantly above their maximum power point will operate at different levels. A first preference level may be provided for the modules to operate at around their maximum power point, a second preference level may be provided for modules operating at a 'mid-way level and a third preference level for modules acting as 'voltage support'.

A further selection criteria comprises setting a module's maximum operating voltage level. The maximum operating voltage level comprises a voltage level below which it is desired to keep the modules. Should a module exceed the maximum operating voltage level, such a module is transitioned preferentially into the series connection to reduce the voltage on the module.

The preference level of any module may be modified by the control unit depending on the voltage level of the module. Should a module operating at the second preference level stabilise at around the maximum power point voltage, the preference level may be increased to the first preference level and a module operating at the third preference level may be moved to the second preference level. Should the voltage of this type of module increase to around the maximum module voltage, the preference level may be decreased to the third preference level and a module operating at the first preference level moved to the second preference level. Should the voltage of this type of module stabilise at neither extreme (determined for example via a zero crossing of the first derivative of a smoothed measure of its voltage, or simply via a timeout) the control unit may swap its preference level with a 'voltage support' module. Generally a new module has a chance of reaching its maximum power point. Choosing the module to be swapped may be a simple random selection or by random selection biased according to module parameters or by module parameters alone, for example by choosing modules with higher maximum power point voltage or lower power.

The control unit sets the maximum operating voltage to a level below a maximum module voltage, being a level above which the module may be damaged by having insufficient headroom to absorb voltage surges. In the event of a spike or surge, current through the system will be absorbed, raising the voltages of in series modules. The difference between the maximum operating module voltage and the maximum module voltage is set to allow sufficient energy to be absorbed across the modules to account for significant overvoltage events.

During significant overvoltage event, the control system is generally not able to communicate with modules due to the transient nature of the event. All modules are programmed to reliably enter a shutdown state when surge current is detected so they block the surge voltage.

During the surge current period, modules with a voltage approaching the maximum module voltage will transition at maximum rate switching to bypass. Current is monitored during overvoltage events and modules will switch out of bypass after a time period based on expected increases in voltages of other modules. That is, a module will switch into bypass as the module approaches its maximum module voltage and monitor current. When it is determined that the current flowing after the module is in bypass is sufficient to raise the voltage of the other modules in the system to around their maximum module voltage, the module switches out of bypass to further absorb energy and reduce the likelihood of any individual module being damaged.

When using information regarding the voltage of modules to determine switching, the control unit predicts voltages in the modules according to information regarding the series current and stored performance information including how the module voltage changes according to total energy stored. The control unit then determines the expected voltage of the module based on this information and uses the expected voltage to control switching of the modules.

At intervals of time, the information regarding the actual voltage of the module is recorded and transmitted to the control unit. The control unit then adjusts the stored performance information based on the difference between the actual voltage of the module at that time and the predicted voltage of the module at that time. The control unit may then make more accurate determinations regarding the expected voltage in future. Information regarding module voltages is communicated to all modules allowing their overload protection circuits to switch out of bypass as described.

As mentioned, the modules may include a step up or down regulator between the power source and the storage device. The control unit controls operation of the modules to bypass the step up or down regulator in conditions where it is more efficient to supply power directly from the power source to the storage device. The control unit stores information regarding the I-V (current-voltage) curve of the power source in order to determine the efficiency of the power source and its voltage varies away from its maximum power point. A local controller operates the step up or down regulator, varying its frequency and whether it is bypassed to ensure maximum efficiency of the switching regulator, power source combination taking into account switching losses, ripple current and conduction losses as the frequency is varied. The local controller may communicate maximum power point information to the control unit or the local controller may form part of the control unit. The local controller switches the step up or down regulator from bypass only when the power lost by operation of the module away from its maximum power point results in a power loss larger than the power loss resulting from activating the step up or down regulator and controls the frequency of the switching regulator to maximise overall efficiency of the switching regulator and power source.

To control operation of the modules, the control unit communicates with each of the modules via control lines. The modules preferably act to maximize throughput of communications along the control lines by having local communications between adjacent modules. Local communications are checked for errors and retransmitted locally as necessary then forwarded to subsequent modules. Critical communications are buffered as necessary while retransmitting to subsequent module so vital data does not get lost. Adjacent modules maintain a local phase Phase Locked Loop (PLL) derived from these communications signals to keep timing synchronised across the system. Timing and voltage errors during switching events cause the series current to perturbate in a predictable way. If not corrected then timing errors cause a step current change where voltage errors cause current to ramp up or down. Series current is monitored and module timing along the string is corrected to cause step and ramped current changes to average to zero for each of the modules.

Where a compensator arrangement is used with fast transitions, the PLL controls timing of switching events to within tens of nano seconds (ns) across the series connection.

The switching times of the modules are controlled to occur at predefined time periods or time periods defined according to a formula. The modules within the system therefore have information to determine when to pause or ignore data communications.

It will be appreciated that multiple systems of the type described may be connected in series for higher maximum voltages. Such systems allow for higher maximum voltages for any given peak slew rate on each individual system.

The control unit of each of such connected systems is in communication with the control unit of the other system. The control units may communicate information such that a system having more available power will export more power to the series string than the less powerful system by providing a higher voltage to the series connection.

Three such power conversion systems may also be formed in a delta configuration with 120 degrees between phases. In such a configuration, the control units of each of the system may communicate information to the control units of the other systems regarding the power available in the system. For stand-alone operation, two arms of the delta may provide voltage support while the third arm controls current as for grid injection in order to reduce complexity and avoid interactions between the arms that could result in instabilities. Alternatively all three arms provide voltage support and adjust their respective arm voltages to consume or provide power. A loop current may be set up to move power from the more powerful systems to the less powerful systems, such that the total energy and power supplied can be balanced around the system or the total amount of power exported on each phase can be balanced. Similar methods can be used with a star connection having delta arms (where the third arm may be removed) where charge is redistributed by creating loop currents around two legs of the star and single delta arm.

The switch times may be communicated to adjacent or series connected systems to provide common switch timing and prevent unnecessary communications disruption. By using predefined switch points, communications throughput is reduced and communications can be paused or ignored on nearby systems without the exact nature of the switch (if any) needing to be communicated.

The formula for determining switching times in one embodiment includes a pseudorandom component. Any interference is therefore broad spectrum and harmonics within the system reduced. In one embodiment, the switching times are based on a prime factor harmonic of the mains greater than a maximum harmonic, for example greater than the $50^{th}$ harmonic.

Electromagnetic compatibility is further improved by adjusting switching times with pseudorandom jitter of 7 μs to spread the spectrum above 150 kHz.

The pseudorandom components are communicated to and used by all modules along with the control unit to ensure timing remains accurate during transitions within the system.

It will be readily apparent to persons skilled in the relevant arts that various modifications and improvements may be made to the foregoing embodiments, in addition to those already described, without departing from the basic inventive concepts of the present invention.

What is claimed is:
1. A method for controlling a power conversion system comprising:
   controlling operation of a plurality of series connected modules, at least some of said modules including a DC power source and a storage device charged by the power source, by transitioning the voltage applied by the storage device between the input and the output of the modules such that the total voltage across the series connected modules comprises an AC signal;

defining one or more voltage control levels for each of or a plurality of the storage devices;

regulating an AC current drawn from the series connected modules over a time period such that a storage parameter based on a sum of a function of the voltages in the storage devices in the modules approaches a target value;

decreasing the target value for a subsequent time period in the event that none of the voltage control levels are reached; or increasing the target value for a subsequent time period in the event that one or more of the voltage control levels are reached.

2. The method in accordance with claim 1, wherein the storage parameter is based on a sum of the squares of the voltages in the storage devices in the modules.

3. The method in accordance with claim 1, wherein the voltage control levels include a total required voltage level, being a minimum sum of the voltages of the storage devices to output a desired AC signal plus a headroom level.

4. The method in accordance with claim 1, wherein the voltage control levels include a power point target level, being a minimum individual module voltage based on the maximum power point of the power source within the module.

5. The method in accordance with claim 4, including the steps of:

transitioning the storage devices of the modules between the input and the output of the modules to provide a maximum module voltage and a minimum module voltage; and selecting which modules to transition from a group of modules based on one or more selection criteria;

wherein one of the selection criteria comprises a power point differential value, being the difference between the voltage of the storage device of each module and the power point target value of the module.

6. The method in accordance with claim 5, wherein the modules to which the power point differential value is applied may comprise groups of modules having one of a plurality of preference levels such that modules having a higher preference level will be switched into the series connection in preference to modules having a lower preference level such that modules having a lower preference level will move to higher voltage levels.

7. The method in accordance with claim 6, wherein more than two preference levels may be set such that modules allowed to move to a voltage significantly above their maximum power point will operate at different levels.

8. The method in accordance with claim 6, wherein a first preference level is provided for the modules to operate at around their maximum power point, a second preference level is provided for modules operating at a transitional level and a third preference level is provided for modules acting as voltage support.

9. The method in accordance with claim 6, wherein a further selection criteria is defined comprising a maximum operating voltage level, such that should a module exceed the maximum operating voltage level, the module is switched preferentially into the series connection to reduce the voltage on the module.

10. The method in accordance with claim 9, wherein the maximum operating voltage is set below a maximum module voltage, being a level above which the module may be damaged, such that the difference between the maximum operating module voltage and the maximum module voltage is set to allow sufficient energy to be absorbed across the modules to account for expected overvoltage events.

11. The method in accordance with claim 10, wherein modules with a voltage approaching the maximum module voltage will switch to bypass.

12. The method in accordance with claim 11, wherein current is monitored during overvoltage events such that when it is determined that the current flowing after the module is in bypass is sufficient to raise the voltage of the other modules in the system to around their maximum module voltage, the module switches out of bypass to further absorb energy.

13. The method in accordance with claim 6, wherein the control unit modifies preference levels of modules depending on the voltage level of the module.

14. The method in accordance with claim 5, including the steps of predicting voltages in the modules according to information regarding the series current and stored performance information including how the module voltage changes according to total energy stored and using the expected voltage of the modules to control switching of the modules.

15. The method in accordance with claim 14, including the step of recording information regarding the actual voltage of the modules at intervals of time and varying the stored performance information based on the difference between the actual voltage of the module and the expected voltage of the module.

16. The method in accordance with claim 1, wherein the control unit communicates with each of the modules via control lines and the modules maintain a phase locked loop to keep timing synchronised across modules.

17. The method in accordance with claim 1, wherein local data communications are ignored during switching times to minimise communication errors potentially caused during such switching.

18. The method in accordance with claim 17, wherein the switching times of the modules are controlled to occur at predefined time periods or time periods defined according to a formula.

19. The method in accordance with claim 18, wherein the formula for determining switching times includes a pseudorandom component such that interference is broad spectrum.

20. The method in accordance with claim 19, wherein the switching times are based on a prime factor harmonic of the mains greater than a maximum harmonic.

21. The method in accordance with claim 1, including the steps of storing information regarding I-V curves of power sources within modules and using the stored information to control operation of step up/down regulators within modules.

22. The method in accordance with claim 21, wherein the step up/down regulators are switched from bypass when the power lost by operation of the module away from its maximum power point results in a power loss larger than the power loss resulting from activating the step up/down regulator.

23. The method in accordance with claim 1, wherein the temperature of a power source is determined and a maximum power point is determined based on the temperature.

* * * * *